United States Patent
Nunokawa et al.

(10) Patent No.: US 8,351,153 B2
(45) Date of Patent: Jan. 8, 2013

(54) MAGNETIC RECORDING HEAD, METHOD OF MANUFACTURING THE SAME, AND MAGNETIC RECORDING/REPRODUCING DEVICE

(75) Inventors: Isao Nunokawa, Kanagawa (JP); Mikito Sugiyama, Kanagawa (JP); Kikuo Kusukawa, Saitama (JP); Hiroyuki Hoshiya, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 786 days.

(21) Appl. No.: 12/559,349

(22) Filed: Sep. 14, 2009

(65) Prior Publication Data

US 2010/0091413 A1    Apr. 15, 2010

(30) Foreign Application Priority Data

Oct. 9, 2008   (JP) .................... 2008-263118

(51) Int. Cl.
G11B 5/127 (2006.01)
(52) U.S. Cl. .................................. 360/125.06
(58) Field of Classification Search ............ 360/125.06, 360/125.12, 125.13, 125.31, 125.18, 123.09, 360/123.11, 125.3, 125.32, 125.17, 125.04, 360/125.15
See application file for complete search history.

(56) References Cited

U.S. PATENT DOCUMENTS

| | | | |
|---|---|---|---|
| 7,009,812 B2 * | 3/2006 | Hsu et al. ................. | 360/125.12 |
| 7,343,668 B2 | 3/2008 | Kobayashi ................ | 29/603.16 |
| 7,426,092 B2 * | 9/2008 | Fukui et al. .............. | 360/125.06 |
| 7,515,381 B2 * | 4/2009 | Baer et al. ................. | 360/125.3 |
| 7,558,019 B2 * | 7/2009 | Le et al. .................... | 360/125.06 |
| 7,920,358 B2 * | 4/2011 | Jiang et al. ............... | 360/125.17 |
| 2004/0150912 A1 * | 8/2004 | Kawato et al. ............. | 360/126 |
| 2005/0068671 A1 * | 3/2005 | Hsu et al. .................. | 360/125 |
| 2005/0141137 A1 | 6/2005 | Okada et al. .............. | 360/122 |
| 2006/0002018 A1 * | 1/2006 | Fukui et al. ............... | 360/125 |
| 2006/0082924 A1 | 4/2006 | Etoh et al. ................. | 360/125 |
| 2006/0198050 A1 * | 9/2006 | Mochizuki et al. ........ | 360/126 |
| 2006/0262453 A1 * | 11/2006 | Mochizuki et al. ........ | 360/125 |
| 2007/0064343 A1 | 3/2007 | Yazawa et al. ............. | 360/125 |

FOREIGN PATENT DOCUMENTS

| | | |
|---|---|---|
| JP | 2005/190518 | 7/2005 |
| JP | 2006/120223 | 5/2006 |
| JP | 2007/087506 | 4/2007 |
| JP | 2007/087551 | 4/2007 |

* cited by examiner

Primary Examiner — Allen Cao
(74) Attorney, Agent, or Firm — Zilka-Kotab, PC

(57) ABSTRACT

According to one embodiment, a magnetic recording head includes a main pole having a throat height portion and a flare portion that is connected to the throat height portion, the flare portion gradually being expanded in width to an upper part in an element height direction. The head also includes a sub pole, magnetic shields disposed via a nonmagnetic layer on a trailing side of the main pole and on both sides in a track width direction of the main pole, and a coil for generating a recording magnetic field from the main pole. The nonmagnetic layer has an upper portion of which the thickness is increased stepwise or in a tapered manner in the element height direction with respect to an ABS side, and each portion of the magnetic shields adjacent to the main pole has a shape corresponding to a surface shape of the nonmagnetic layer.

12 Claims, 12 Drawing Sheets (a)

(b)

MAGNETIC RECORDING HEAD, METHOD OF MANUFACTURING THE SAME, AND MAGNETIC RECORDING/REPRODUCING DEVICE

RELATED APPLICATIONS

The present application claims priority from a Japanese Patent Application filed Oct. 9, 2008 under Appl. No. 2008-263118, which is incorporated herein by reference.

FIELD OF THE INVENTION

The present invention relates to a magnetic recording head that generates a recording magnetic field to a recording medium, and a magnetic recording/reproducing device mounted with the magnetic recording head.

BACKGROUND OF THE INVENTION

Recently, there has been an increase in demand for higher surface recording density, and in order to respond to this demand, smaller and smaller writing size on a magnetic recording medium may be used. Accordingly, heat fluctuation of magnetization is problematic as a factor of destabilizing a magnetization region of a medium. As a method of solving the problem, a perpendicular magnetic recording method has been used, in which a magnetization signal is recorded in a direction perpendicular to a medium. Even in the perpendicular magnetic recording method, a single pole portion for writing, which generates a recording magnetic field perpendicular to a medium, is reduced in size in order to increase surface recording density, and therefore it is now difficult to generate a sufficiently large perpendicular magnetic field to a medium to induce reversal of magnetization of the recording medium.

To compensate such insufficient writing field strength, a method is given, in which throat height (a range defining width of a writing pole) is reduced, thereby a saturation position of a magnetic field is made close to an air bearing surface to secure a magnetic field strength. However, this leads to a problem that a flare section, which collects magnetic field generated by induction of a coil and guides the magnetic field to the air bearing surface, is located close to an air bearing surface, so that magnetic field leakage occurs from the flare section, and consequently recording width is increased with respect to a geometric width of a single pole for writing.

Thus, some art discloses a method to reduce write blurring by increasing a recording width due to magnetic field leakage, in which a magnetic shield layer is provided around a main pole via a nonmagnetic layer. Jap. Pat. Appl. No. JP-A-2007-87506 and Jap. Pat. Appl. No. JP-A-2007-87551 disclose methods respectively, in which a shield layer combined with a sub pole is provided on a trailing side of a main pole via a nonmagnetic layer to obtain a certain magnetic field gradient while controlling magnetic field leakage on the trailing side. Furthermore, Jap. Pat. Appl. No. JP-A-2005-190518 and Jap. Pat. Appl. No. JP-A-2006-120223 disclose means respectively, wherein shield layers, which are disposed on a trailing side of a main pole and on both sides in a track width direction thereof in a manner of enclosing the main pole from three sides, are used to control write blurring on the trailing side and on both sides in the track width direction.

The magnetic shield disposed via the nonmagnetic layer around the main pole absorbs a magnetic flux that does not need to be written into a recording medium, and defines a magnetic field gradient on a trailing side and defines magnetic track width. However, in the case that the shield has a low element height from an air bearing surface, an adequate shield effect is not obtained, leading to magnetic flux leakage. In the case that the shield has a high element height, amount of magnetic flux to be absorbed by the shield is increased, consequently writing field strength is problematically reduced.

Therefore, it would be beneficial to improve a structure of shields disposed on a trailing side of a main pole and on both sides in a track width direction thereof in a manner of enclosing the main pole from three sides, thereby providing a perpendicular magnetic recording head, in which a high magnetic field gradient is achieved, a shield effect is improved, and recording performance is not degraded.

SUMMARY OF THE INVENTION

A magnetic recording head according to one embodiment includes a main pole having a throat height portion, and a flare portion that is connected to the throat height portion, and gradually expanded in width to an upper part in an element height direction. A sub pole that absorbs a return magnetic field from a recording medium, magnetic shields disposed via a nonmagnetic layer on a trailing side of the main pole and on both sides in a track width direction thereof, and a coil for generating a recording magnetic field from the main pole are also included. The nonmagnetic layer has a portion of which a thickness is increased stepwise or increased in a tapered manner in an upper part in the element height direction with respect to an air bearing surface side facing the recording medium, and each portion of the magnetic shields adjacent to the main pole has a shape corresponding to a surface shape of the nonmagnetic layer.

A position at which a thickness of the nonmagnetic layer is changed may be a boundary between the throat height portion and the flare portion, or may be in the middle of the throat height portion. For example, the nonmagnetic layer may be changed in thickness in two stages on the trailing side of the throat height portion, or may have a region in which thickness is gradually increased in an element height direction on the trailing side of the throat height portion.

According to another embodiment, a magnetic flux which has been absorbed from a main pole into a shield on a flare side, is blocked by a thick nonmagnetic layer, and therefore an amount of magnetic fluxes to be absorbed is reduced. Therefore, a certain amount of magnetic flux, which has been lost by the shield, is added to the main pole, and consequently a strength of a magnetic field emitted from the main pole to a medium is increased. In addition, since the magnetic flux is absorbed only by a shield near the main pole via a nonmagnetic layer having a small thickness on an air bearing surface side, a high magnetic field gradient and a narrow magnetic writing width are achieved.

According to some embodiments, a magnetic recording head having a high magnetic field gradient and strong field strength may be provided by reducing an amount of magnetic fluxes to be absorbed by a shield while improving a shield effect.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description,

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

Figure 1:
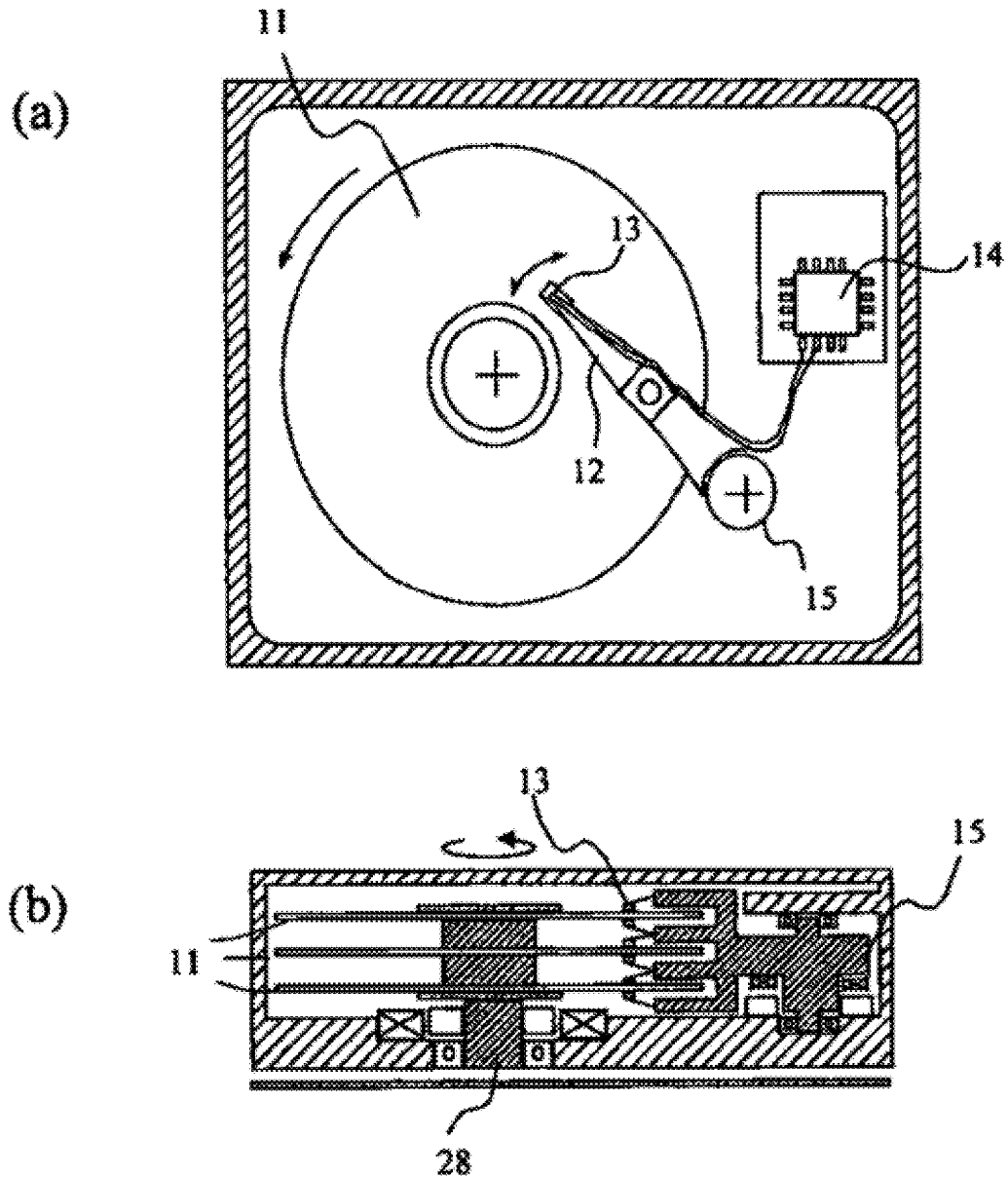
FIG. 1 is a recording/reproducing device according to one embodiment.

FIG. 1 is a conceptual view of a magnetic recording/reproducing device. A magnetic disk (perpendicular magnetic recording medium) 11 is rotationally driven by a motor 28. When information is inputted or outputted, a slider 13 fixed to a tip of a suspension arm 12 is moved to a predetermined position on a rotating magnetic disk 11, and a magnetization signal is recorded or reproduced by a thin film magnetic head formed on the slider 13. A rotary actuator 15 is driven, so that a position of the magnetic head in a radial direction of the magnetic disk (track) can be selected. A recording signal into the magnetic head and a read signal from the magnetic head are processed by a signal processing circuit 14.

Figure 2:
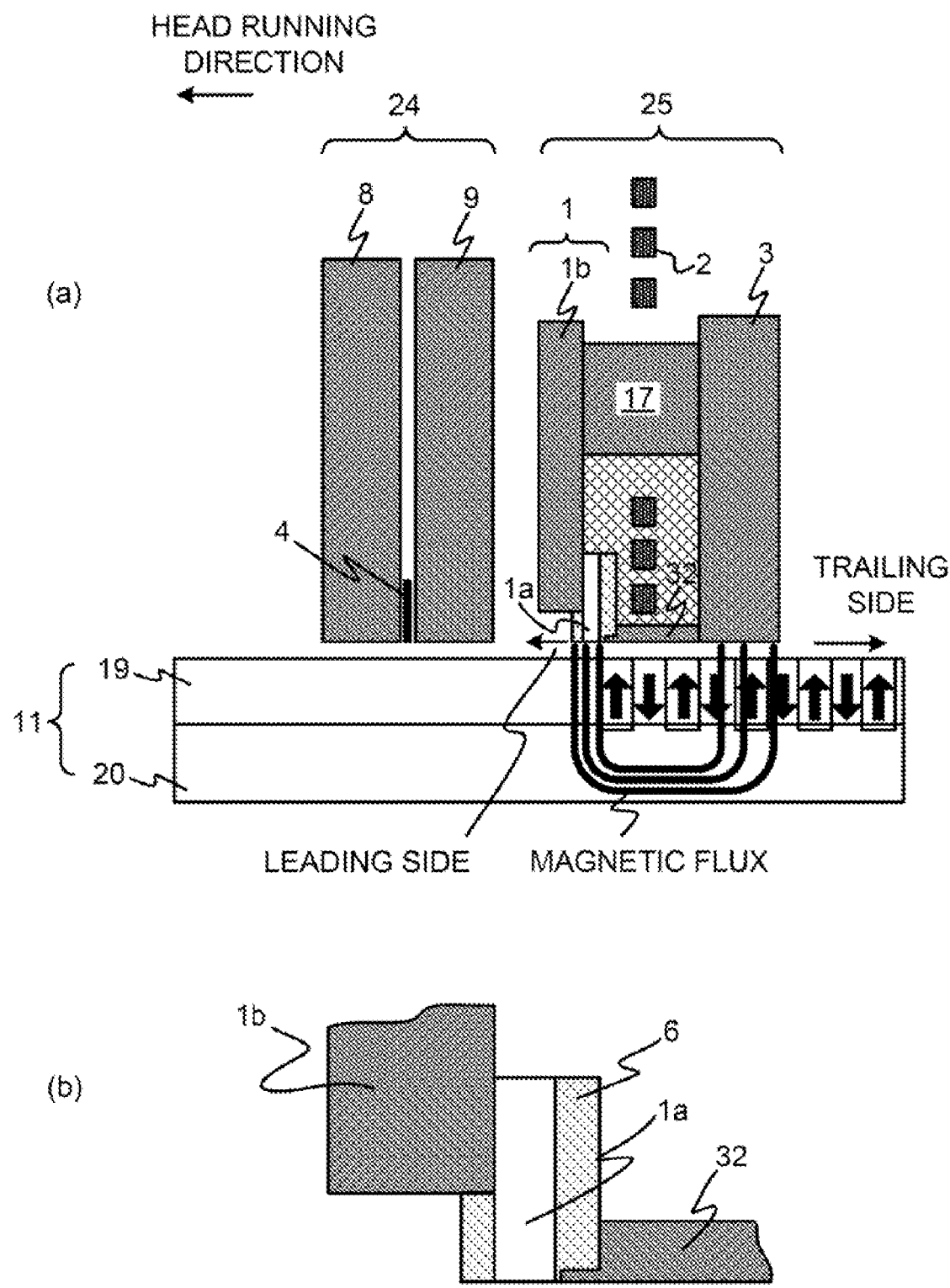
FIG. 2 is a schematic section view and a schematic enlarged view at a track center of an example of a magnetic head according to one embodiment.

FIG. 2(a) is a schematic section view at a track center showing an example of a magnetic head according to the invention, and FIG. 2(b) is an enlarged view near a tip of a main pole 12 on an air bearing surface side. The magnetic head is a recording/reproducing composite head having a single-pole recording head 25 including a main pole 1 and an auxiliary pole 3, and a reproducing head 24. A reproducing element 4 including a giant magneto-resistive-effect element (GMR) or a tunnel magneto-resistive-effect element (TMR) is disposed between a pair of magnetic shields (reproducing shields) including a lower shield 8 on a leading side and an upper shield 9 on a trailing side. The main pole 1 and the auxiliary pole 3 of the recording head 25 are magnetically connected to each other by a pillar 17 at a position away from the air bearing surface, and a thin film coil 2 is wound on a magnetic circuit configured of the main pole 1, the auxiliary pole 3, and the pillar 17. The main pole 1 is configured of a main-pole yoke portion 1b connected to the pillar 17, and a pole tip 1a. For the pole tip 1a of the main pole, for example, a single-layer film or a stacked film of a magnetic material having high saturation magnetic-flux density, which includes at least two elements of Co, Ni and Fe can be used. As a material of the main-pole yoke portion 1b, for example, a magnetic material having high permeability, which includes at least two elements of Co, Ni and Fe, is used.

The pole tip 1a includes a throat height portion on an air bearing surface side of the head, which defines writing width into the recording medium 11, and a flare portion that is connected to an upper part in an element height direction of the throat height portion, and gradually expanded in width to an upper part in the element height direction.

A magnetic field emitted from the main pole 1 of the magnetic head 25 enters the auxiliary pole 3 through a magnetic recording layer 19 and a soft under layer (SUL) 20 of the perpendicular recording medium 11, and thereby a magnetization pattern is recorded in the magnetic recording layer 19. A shape of the magnetization pattern is defined by writing performance of the main pole 1 and a magnetic shield 32 provided on the air bearing surface side. The magnetic shield 32 of the invention is formed on three sides on the air bearing surface side of the pole tip 1a of the main pole, that is, on a trailing side and both sides in a track width direction via a nonmagnetic layer. The nonmagnetic layer formed between the pole tip 1a and the shield 32 has a processed level-difference portion in which thickness on the air bearing surface side is different from thickness in an upper part in the element height direction. Therefore, the shield 32 formed in accordance with a surface shape of the nonmagnetic layer is set to be low in height in a region adjacent to the pole tip 1a of the main pole compared with total height in the element height direction of the shield 32.

According to one embodiment, a perpendicular magnetic recording head having high recording field strength and a high magnetic field gradient is provided. A thickness of a nonmagnetic layer 6, which magnetically separates between a main pole 1 and a shield 32, is changed, and a shape of the shield is formed in accordance with such change in thickness, thereby a high magnetic field gradient and high recording field strength are achieved.

Figure 3:
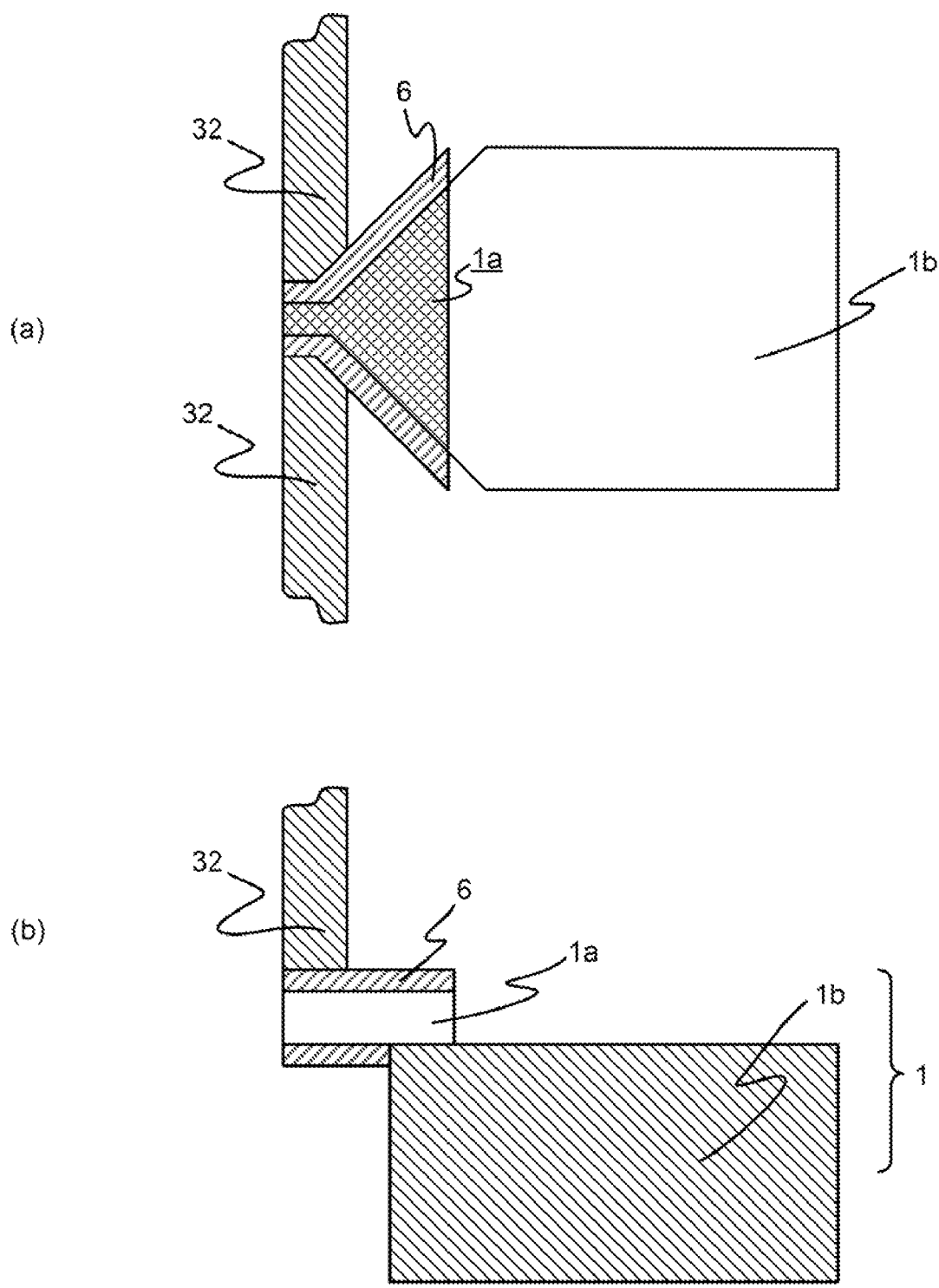
FIG. 3 is a schematic plan view and a schematic side-section view of a conventional perpendicular magnetic recording head.

FIG. 3 extractively shows a portion including the main pole, the nonmagnetic layer, and the shield of a conventional perpendicular magnetic recording head. FIG. 3(a) is a schematic plan view of the portion, and FIG. 3(b) is a schematic side section view thereof.

As shown in FIG. 3(a), a conventional nonmagnetic layer 6 that magnetically separates between the pole tip 1a of the main pole and the shield 32 on either side in a track width direction is deposited with an approximately uniform thickness corresponding to a surface shape of the pole tip. As shown in a section view of FIG. 3(b), the shield 32 on a trailing side of the main pole is also formed with an approximately constant thickness corresponding to the surface shape of the pole tip 1a. Deposition thickness of the nonmagnetic layer 6 determines an interval between the pole tip 1a and the shield 32 on either side in the track width direction, so that magnetic flux leakage to an adjacent track is prevented, and thus write blurring is suppressed. On a trailing side of the main pole 1, only the nonmagnetic layer on the trailing side is processed to reduce an interval between the pole tip 1a of the main pole and the shield 32 on the trailing side, thereby curvature of a magnetic field is reduced and a magnetic field gradient (slope of change in magnetic field) is increased, so that bit transition width is reduced.

Figure 4:
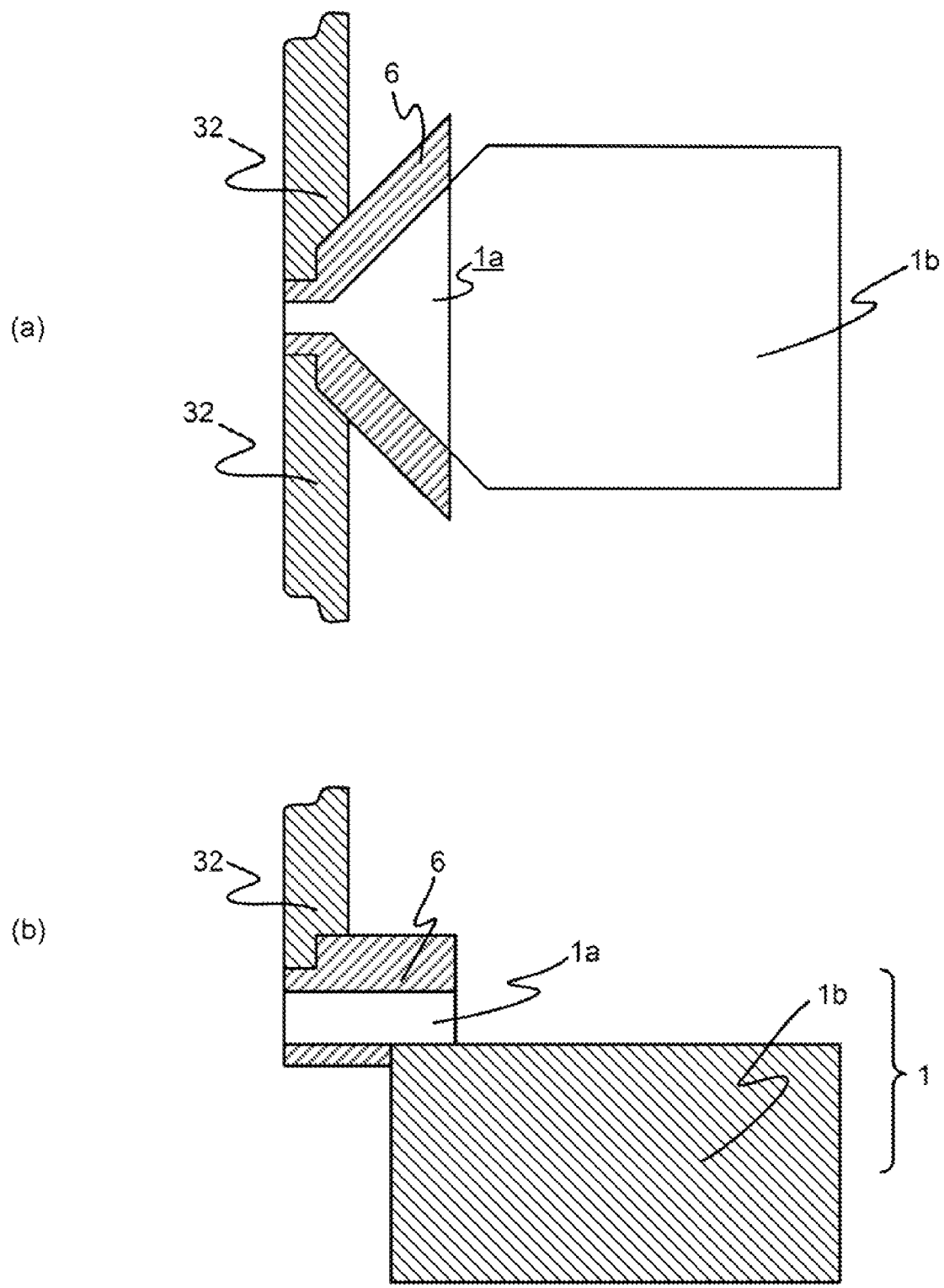
FIG. 4 is a schematic plan view and a schematic side-section view of a perpendicular magnetic recording head according to one embodiment.
Figure 5:
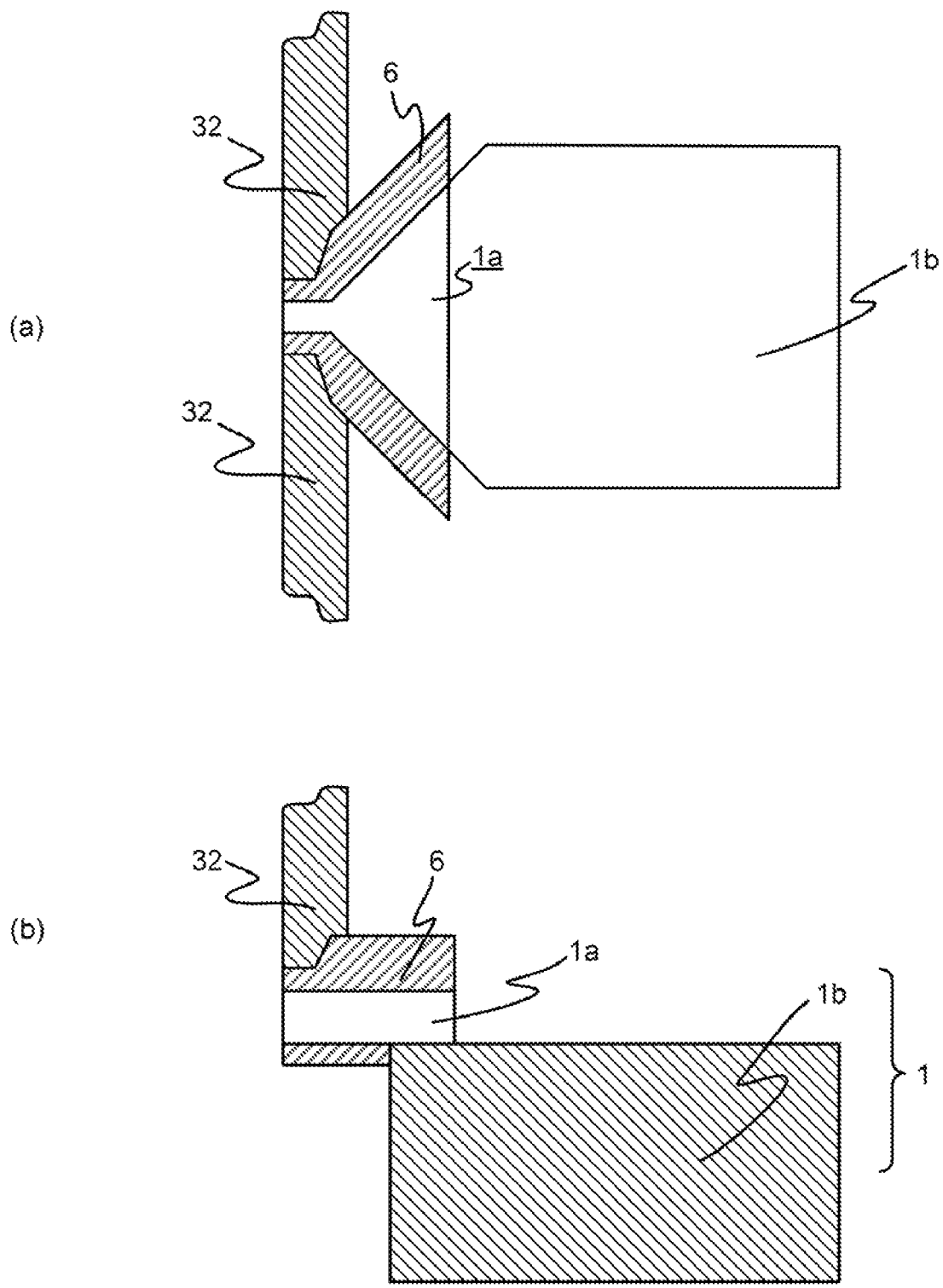
FIG. 5 is a schematic plan view and a schematic side-section view of another perpendicular magnetic recording head according to one embodiment.

FIGS. 4 and 5 show schematic plan views and schematic side-section views showing an example of a perpendicular magnetic recording head according to some embodiments, respectively. FIG. 4 shows an example where thickness of a nonmagnetic layer coated on the pole tip of the main pole has a two-stepped shape in which the thickness is small in an air bearing surface side, and large in an upper side in an element height direction. FIG. 5 shows an example where the two-stepped shape portion has a tapered shape where thickness is gradually increased to an upper part in an element height direction.

First, an example shown in FIG. 4 is described. In the case of the perpendicular magnetic recording head, as shown in FIG. 4(a), a nonmagnetic layer 6 in a track width direction, which magnetically separates the pole tip 1a of the main pole 1 from the shield 32, has a level-difference portion at which thickness is changed stepwise, and thickness of the nonmagnetic layer is small in an air bearing surface side with respect to the level-difference portion as an origin, and thickness of the nonmagnetic layer 6 is large on a flare side in an upper part in an element height direction with respect to the level-difference portion. In addition, as shown in FIG. 4(b), the nonmagnetic layer 6 formed on the trailing side of the main pole also has a level-difference portion at which thickness is changed stepwise, and since the shield 32 is formed in accordance with the surface shape of the nonmagnetic layer 6, an interval between the main pole 1a and the shield 32 is narrow on the air bearing surface side with respect to the level-difference portion as an origin, and wide on the flare side in the upper part in the element height direction. That is, the nonmagnetic layer 6 has a different surface shape from a surface of the pole tip 1a of the main pole 1.

By forming such a configuration, while keeping a previous shield effect on the air bearing surface side, the shield 32, which is located on the flare side in the upper part in the element height direction with respect to the processed level-difference as the origin, is widened in a magnetic gap to the pole tip 1a of the main pole 1. Therefore, since thickness of the nonmagnetic layer is large in the flare portion of the main pole compared with the previous structure as shown in FIG. 3, a magnetic flux, which has been absorbed by the shield 32 and thus lost, is reduced. Therefore, strength of a magnetic field, which is emitted from the air bearing surface by the pole tip 1a of the main pole 1, is increased, and a changeable magnetic field gradient is accordingly increased, leading to improvement in writing performance into the perpendicular magnetic recording head. In the case of the two-stepped shape, since magnetic flux leakage from the low shield height portion is concerned, the level-difference portion, at which thickness of the nonmagnetic layer 6 is changed, is preferably formed about 30 nm or more from the air bearing surface in the element height direction.

In the case where the two-stepped shape portion has the taper shape in which thickness continuously increases in the element height direction as shown in FIG. 5, the same effect as in the shape of FIG. 4 is obtained. However, since absorbed amount of a magnetic flux into the shield 32 is increased with increases in surface area due to the taper shape of the nonmagnetic layer 6, magnetic field strength is somewhat reduced under the same condition. However, as an advantage of providing the taper shape, even if the two-stepped shape portion and a taper tip portion on the air bearing surface side are made close to the air bearing surface, since height of the shield 32 is continuously increased in the element height direction, magnetic flux leakage from the shield 32 can be prevented. Therefore, the shield 32 is formed in a condition that the taper tip portion of the nonmagnetic layer 6 is provided close to the air bearing surface, thereby magnetic field strength can be increased.

The magnetic recording head according to one embodiment and the magnetic recording head having the previous shape as shown in FIG. 3 were subjected to calculation of magnetic field strength and a magnetic field gradient, showing recording performance, by using three-dimensional magnetic-field calculations.

Figure 6:
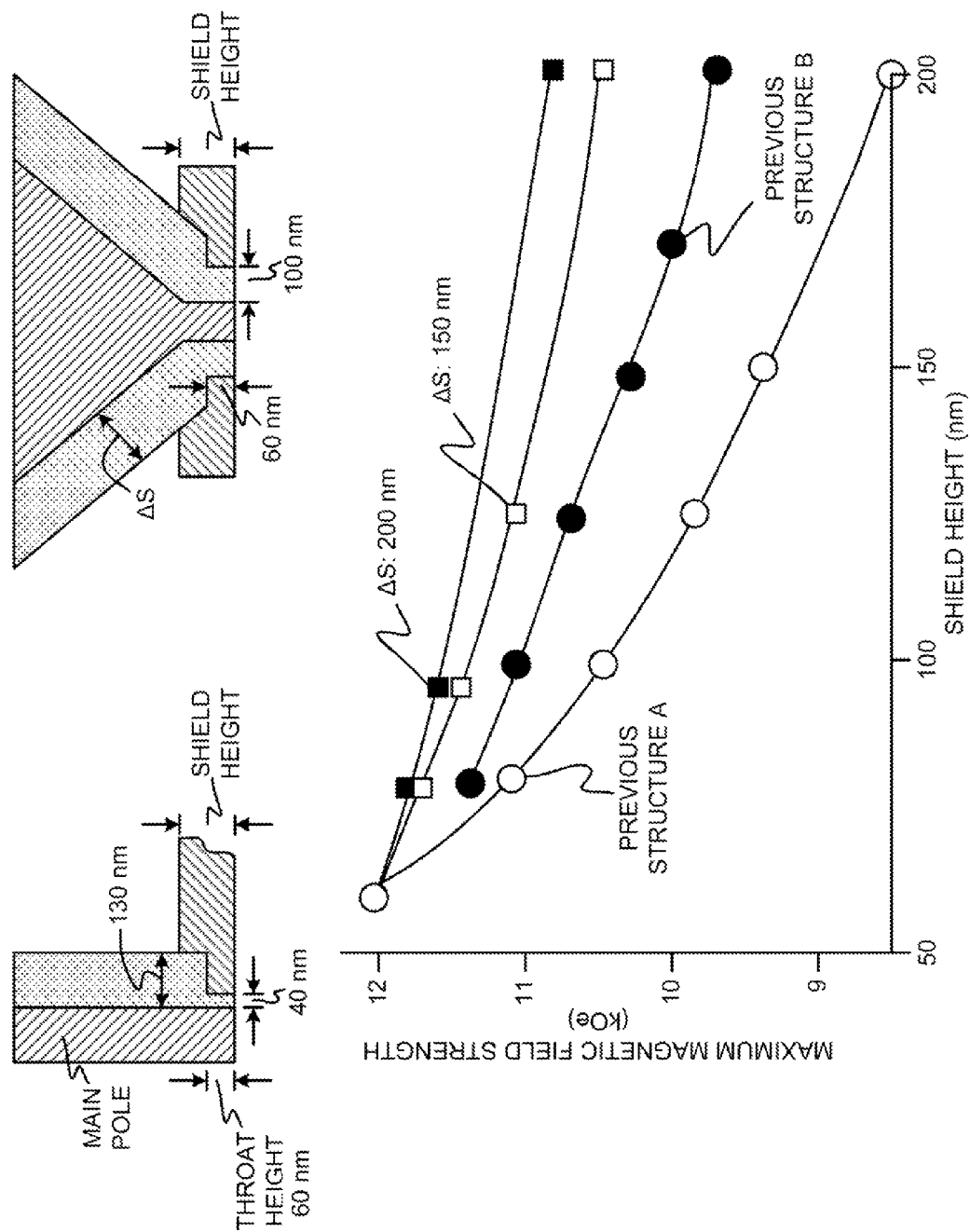
FIG. 6 includes diagrams showing a relationship between shield height and magnetic field strength according to one embodiment.

FIG. 6 shows a relationship between shield height in the element height direction from the air bearing surface and magnetic field strength in a case where the shield height is changed. A calculation condition is as follows. In a recording head according to one embodiment, it was assumed that track width, which defines writing width into the main pole 1, was 80 nm, thickness of the main pole was 180 nm, and an angle of 9° corresponding to a skew angle θ with respect to a recording medium was given so that an inverted trapezoidal shape was formed, of which the width was narrow in a leading side, and wide in a trailing side. In addition, the throat height to the air bearing surface was assumed to be 60 nm, and the flare portion was assumed to extend from throat height 0 (a connection point between the throat height portion and the flare portion) to a height position of 4.9 μm in the element height direction.

In the calculation, both the throat height length defining the writing pole width, and the shield height of a small thickness portion being low in height from the air bearing surface was assumed to be 60 nm, and a thickness change point (level-difference position) of the nonmagnetic film was fixed to a height position of 60 nm in the element height direction, therefore a shield height of 60 nm was assumed as an origin in the previous example, and comparison between the invention and the previous example was performed in a region of shield height of 60 nm or more.

Cobalt-nickel-iron (CoNiFe) was used as a material of the pole tip 1a of the main pole 1, and a saturation magnetic flux density of 2.4 T and a relative permeability of 500 were assumed. For the main-pole yoke portion 1b, 80 at % Ni-20 at % Fe having a saturation magnetic flux density of 1.0 T and a relative permeability of 1500 was used. For the shield 32, 80 at % Ni-20 at % Fe having a saturation magnetic flux density of 1.0 T and a relative permeability of 1500 was used. CoTaZr was used as a material of the soil under layer 20 of the magnetic recording medium 11, and thickness of the layer 20 was assumed to be 60 nm. A distance from the air bearing surface of the head to a surface of the soft under layer 20 was assumed to be 44 nm, and a recording magnetic field was calculated at a position supposed as a center position of the magnetic recording layer 22 nm distant from the air bearing surface of the head. A medium recording layer of the recording medium 11 was assumed to be 20 nm in thickness, and a magnetization characteristic of the layer was not considered.

The conventional head compared with the head according to one embodiment has the structure shown in FIG. 3, and characteristics of the head were shown by A and B in the figure. In a structure A, thickness of the nonmagnetic layer 6 was 100 nm on either side in the track width direction of the pole tip 1a of the main pole 1, and 40 nm on the trailing side thereof, resulting in a shape corresponding to a surface shape of the pole tip 1a of the main pole 1. For reference, a widely used trailing shield structure was subjected to calculation as a previous structure B for comparison. In the structure, the shield 32 is disposed only on the trailing side of the main pole 1a, and a gap size of 40 nm is provided in correspondence to thickness of the nonmagnetic layer 6.

In a structure of the invention, the processed level-difference portion of the nonmagnetic layer 6 was adjusted to a position of the throat height 0 nm being 60 nm from the air bearing surface in the element height direction. It was assumed that thickness of the nonmagnetic layer 6 was 100 nm on either side in the track width direction of the pole tip 1a of the main pole 1, and 40 nm on the trailing side thereof, and 130 nm on the trailing side of a flare side portion with respect to the level-difference, and 150 nm or 200 nm on either side in the track width direction on the flare side, and the shield 32 was formed in accordance with a surface shape of the nonmagnetic layer 6.

A horizontal axis of FIG. 6 corresponds to a height of the shield 32 in the element height direction from the air bearing surface. However, if height of the shield 32 is low, while magnetic field strength is high, the shield 32 is saturated, and magnetic field leakage from the shield 32 occurs. Therefore, height of the shield 32 was assumed to be 60 nm or more.

According to the calculation, when height of the shield 32 is generally increased, since a magnetic flux absorbed by the shield is increased, magnetic field strength is decreased. When thickness of the nonmagnetic layer is varied between the throat height side and the flare side as in the invention, a magnetic field is gently decreased, and degradation in writing performance is small with respect to variation in shield height in manufacturing. Moreover, in the calculation, since the level-difference portion, from which thickness of the nonmagnetic layer 6 increases, is provided with the element height of 60 nm from the air bearing surface, high magnetic field strength is kept in the structure of the invention compared with each of the previous structures A and B in a region of shield height of 60 nm or more.

Figure 7:
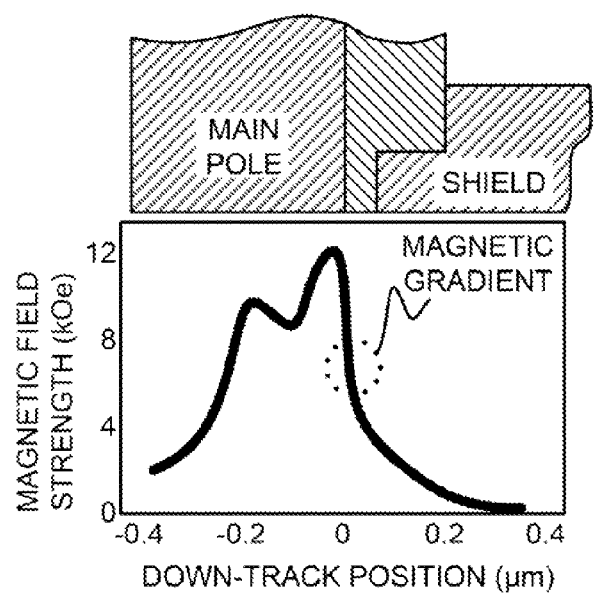
FIG. 7 includes diagrams showing a relationship between shield height and a magnetic field gradient according to one embodiment.
Figure 7:
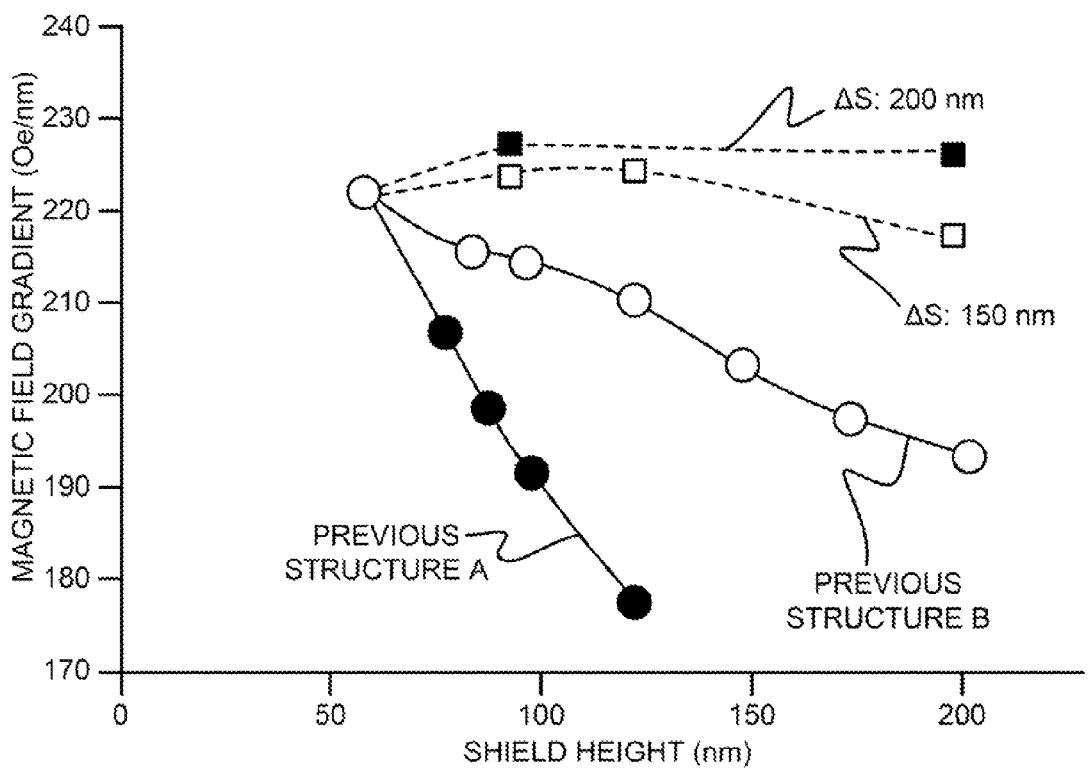

FIG. 7 includes diagrams comparatively showing magnetic field gradients of the respective magnetic recording heads having the structure of the invention and having the previous structure by using the same calculation model as that in FIG. 6. A vertical axis of FIG. 7 shows a magnetic field gradient in the case that writing field strength is 7.5 kOe. When shield height in the element height direction from the air bearing surface is increased, the magnetic field gradient is decreased with a decrease in magnetic field strength as shown in FIG. 6 in each of the recording heads A and B having the previous structure. However, in the case of the structure according to one embodiment, although height of the shield 32 increases and thus magnetic field strength is decreased, a certain magnetic field gradient is kept in a range of 60 nm to 125 nm of the height, and furthermore in the case that thickness $\Delta S$ of the nonmagnetic layer 6 is 200 nm on either side in the track width direction, such a range is expanded, and the magnetic field gradient is gently reduced along with reduction in magnetic field strength. This that when absorption of a magnetic flux into the shield 32 is eliminated on the flare side with respect to the level-difference, and thereby strength of a magnetic field emitted by the main pole is not reduced, the magnetic field gradient is determined by the shield 32 formed with an element height from the air bearing surface to the level-difference of the nonmagnetic layer 6.

From the calculation results, the level-difference is provided in the nonmagnetic layer 6 that magnetically separates between the main pole and the shield 32, thereby the shield 32 for obtaining high magnetic field strength and a high magnetic field gradient of the main pole 1 may have two different functions. As a first function, the shield 32 from the air bearing surface to the level-difference in the element height direction acts as a shielding section that controls the magnetic field gradient as writing performance, and controls write blurring to an adjacent track. As a second function, the shield portion having a height to the flare side end in the element height direction performs a shield-saturation prevention function of flowing a magnetic flux to prevent a phenomenon that the shield is saturated by a magnetic flux absorbed by the shield on the air bearing surface side, leading to magnetic flux leakage from the shield.

Figure 8:
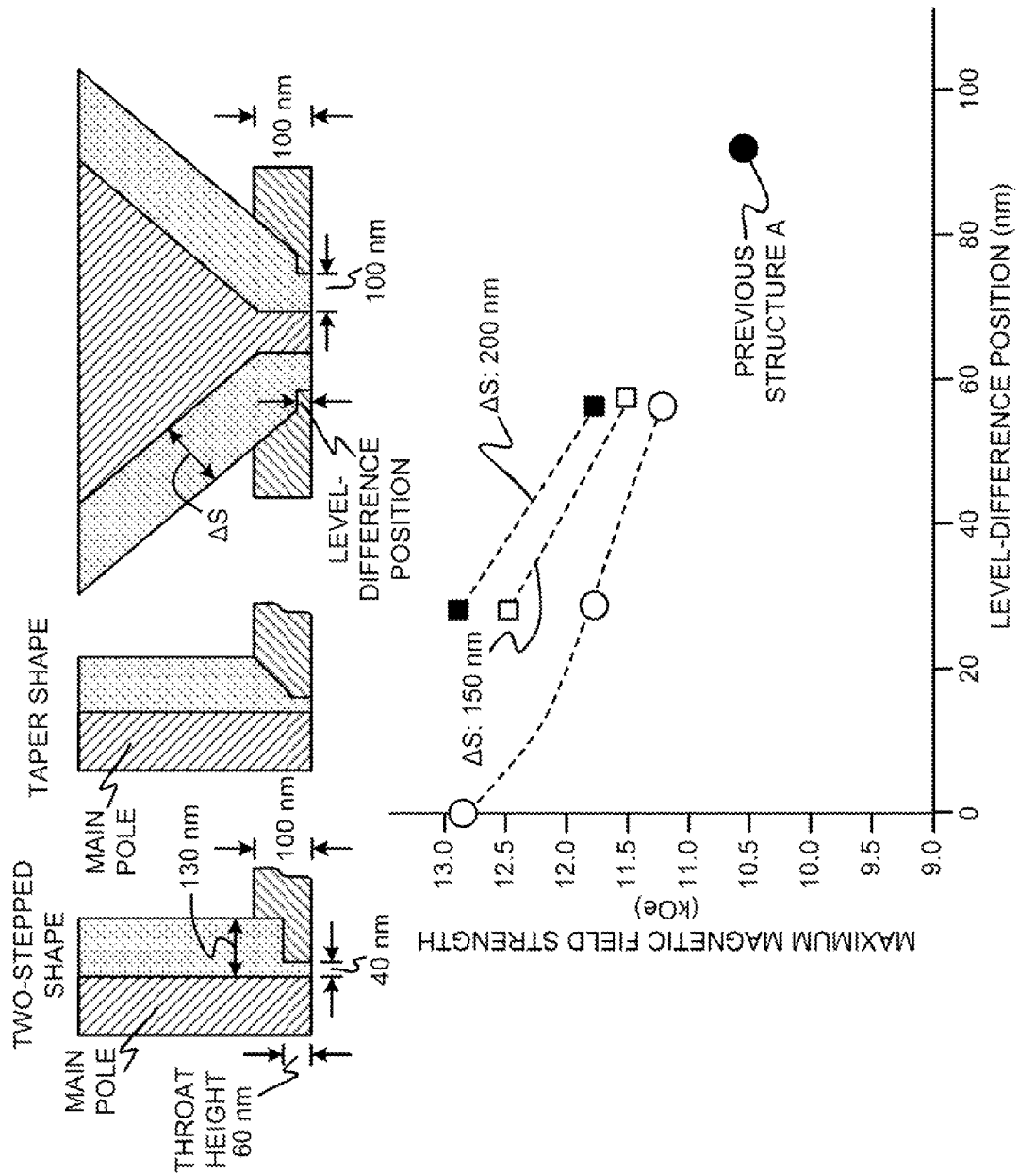
FIG. 8 includes diagrams showing a relationship between a position of a processed level-difference of a nonmagnetic layer and magnetic field strength according to one embodiment.

When the shield 32 was formed using the same calculation model as in the case of FIG. 6 while the shield height was fixed to 100 nm, and a level-difference position of the nonmagnetic layer 6 in the element height direction with respect to the air bearing surface was changed, magnetic field strength was calculated. FIG. 8 shows a calculation result. In addition, in the case of $\Delta S=150$ nm, when the nonmagnetic layer 6 on the trailing side was formed in a tapered shape in which thickness of the layer is continuously increased in the element height direction, a calculation result was shown by triangles being plotted.

In the case that the shield 32 was formed when the level-difference of the nonmagnetic layer 6 was set at a throat height of 30 nm between the air bearing surface and a position of the throat height zero being the connection point between the throat height portion and the flare portion, compared with the case that the level-difference of the nonmagnetic layer 6 is set at a position of 60 nm in the height direction from the air bearing surface, a magnetic flux absorbed by the shield 32 is reduced, and magnetic field strength can be increased by 1 kOe.

However, while it is preferable that a step is provided in the nonmagnetic layer 6 in the throat height portion, so that a shield is lowered in the element height direction to increase magnetic field strength, a large amount of magnetic flux enters the shielding section, and magnetic flux leakage occurs due to local magnetic-field saturation of the shielding section, which increases a magnetic field in a shield side of a magnetic field gradient shown in FIG. 7, and consequently a magnetic field gradient is concernedly degraded. Therefore, the level-difference of the nonmagnetic layer 6 is provided at a position 30 nm or more distant from the air bearing surface. In the case that a position of the level-difference is set at a position less than 30 nm distant from the air bearing surface in order to further reduce the magnetic flux absorbed by the shield 32 to achieve a high magnetic field strength and a high magnetic field gradient, a shape of the shield-saturation prevention function portion having a large volume needs to be devised. For example, part or all of the two-stepped shape is formed in a taper shape in which thickness of the nonmagnetic layer 6 is continuously increased in the element height direction, thereby the shield 32 formed in accordance with the nonmagnetic layer 6 is continuously increased in volume in the element height direction, so that magnetic field saturation of the shield 32 is prevented. Therefore, even if a taper tip is set at the air bearing surface, magnetic flux leakage from the shield can be prevented. In such a case, since magnetic field strength is increased by about 1 kOe, magnetic field gradient, which changes with change in magnetic field strength, can be expected to be increased.

Figure 9:
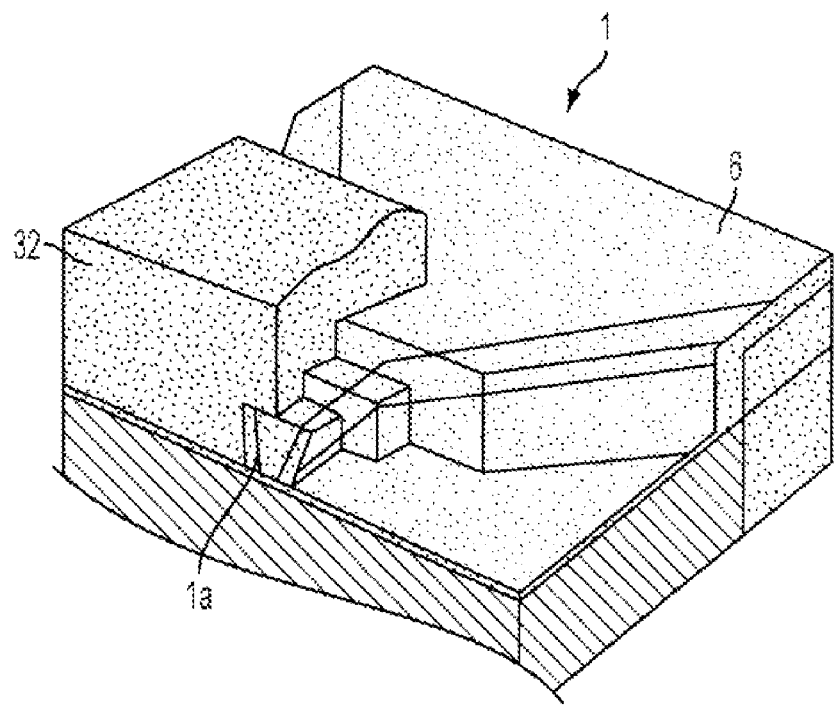
FIG. 9 includes views for illustrating other examples of a shield shape according to one embodiment.
Figure 9:
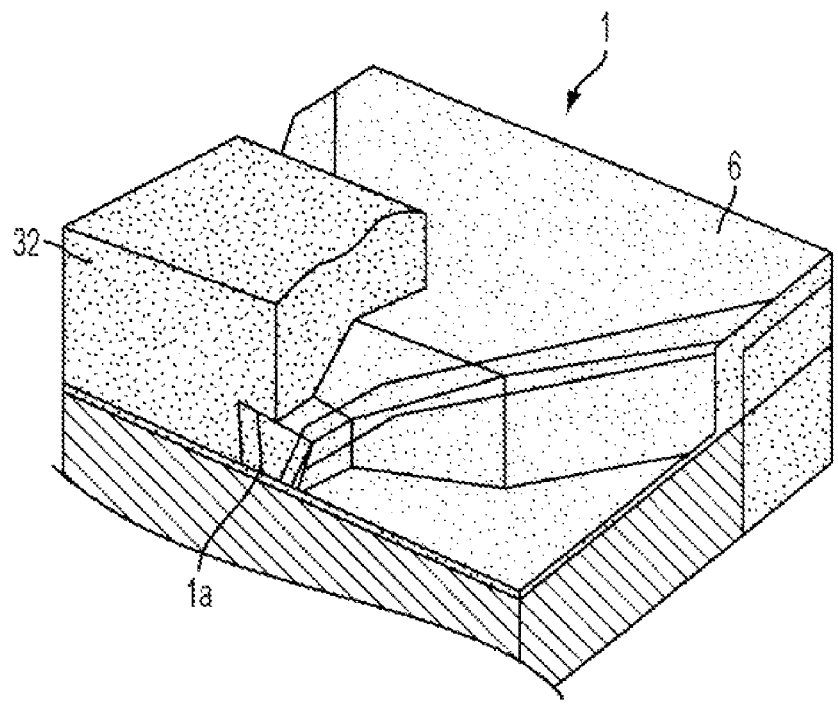

FIG. 9 includes views for illustrating other examples of the shield shape according to some embodiments. FIG. 9(a) shows an example where the level-difference of the nonmagnetic layer is provided in two stages in the throat height portion. According to the example, a first stepwise level-difference is provided in the nonmagnetic layer 6 at an upper part in the element height direction from the air bearing surface, and a second stepwise level-difference is provided on a flare side with respect to the first level-difference, so that while volume of the shield 32, which is formed in accordance with a surface shape of the nonmagnetic layer 6, is stepwise increased, a magnetic flux in the shielding section is flowed, and thereby a magnetic flux being absorbed by the shield and thus lost is reduced, consequently a magnetic flux can be effectively supplied to the pole tip 1a of the main pole 1.

FIG. 9(b) shows a structure where a level-difference portion of the nonmagnetic layer 6 is processed into a tapered shape such that an interval between the main pole 1 and the shield 32 has a portion being expanded in the element height direction from the air bearing surface, so that while shield volume is increased, a magnetic flux leaked into the shield is prevented. The same effect as in the structure of FIG. 9(a) is expected from the structure.

Figure 10:
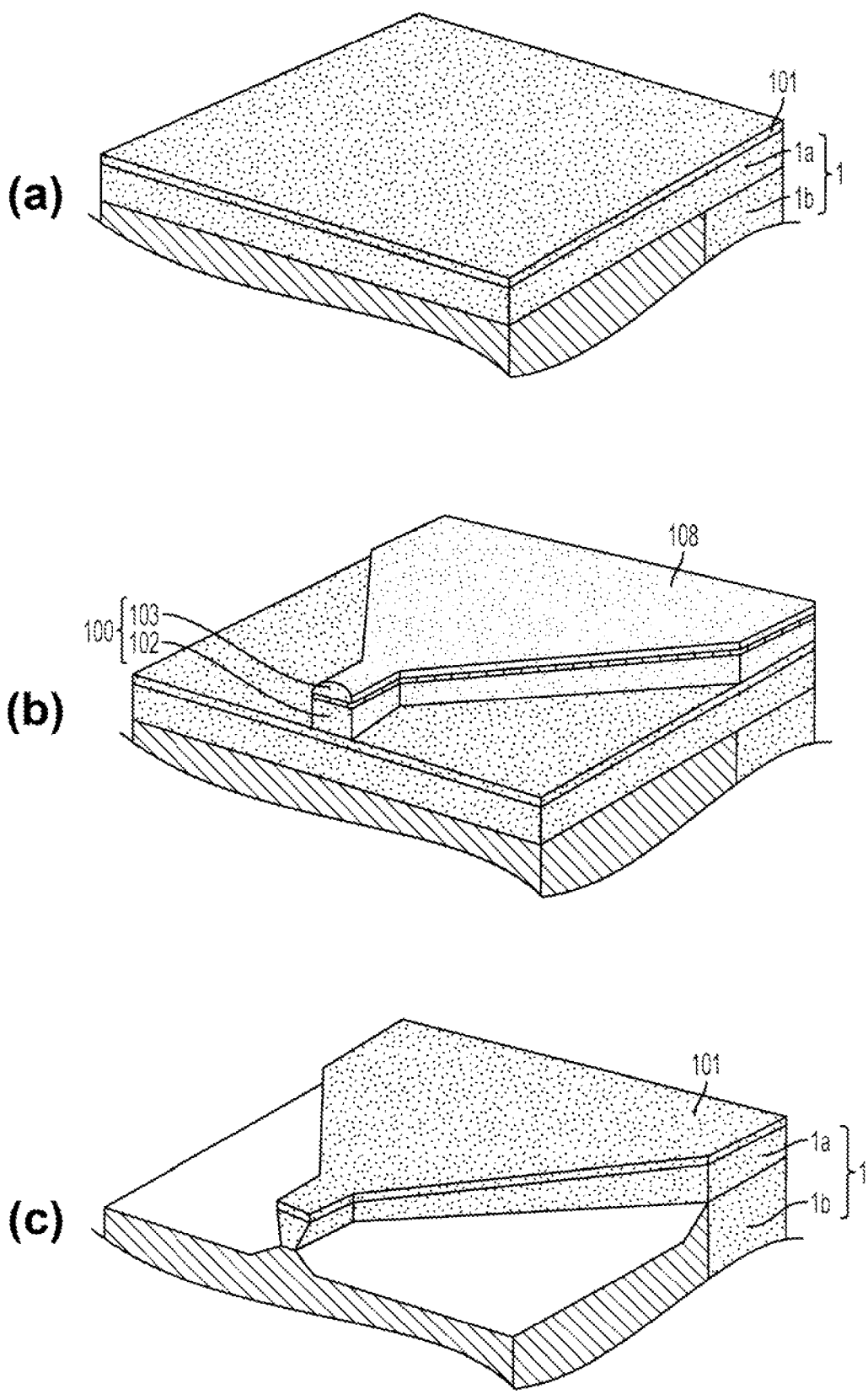
FIG. 10 includes views showing a manufacturing process of a magnetic recording head according to one embodiment.
Figure 11:
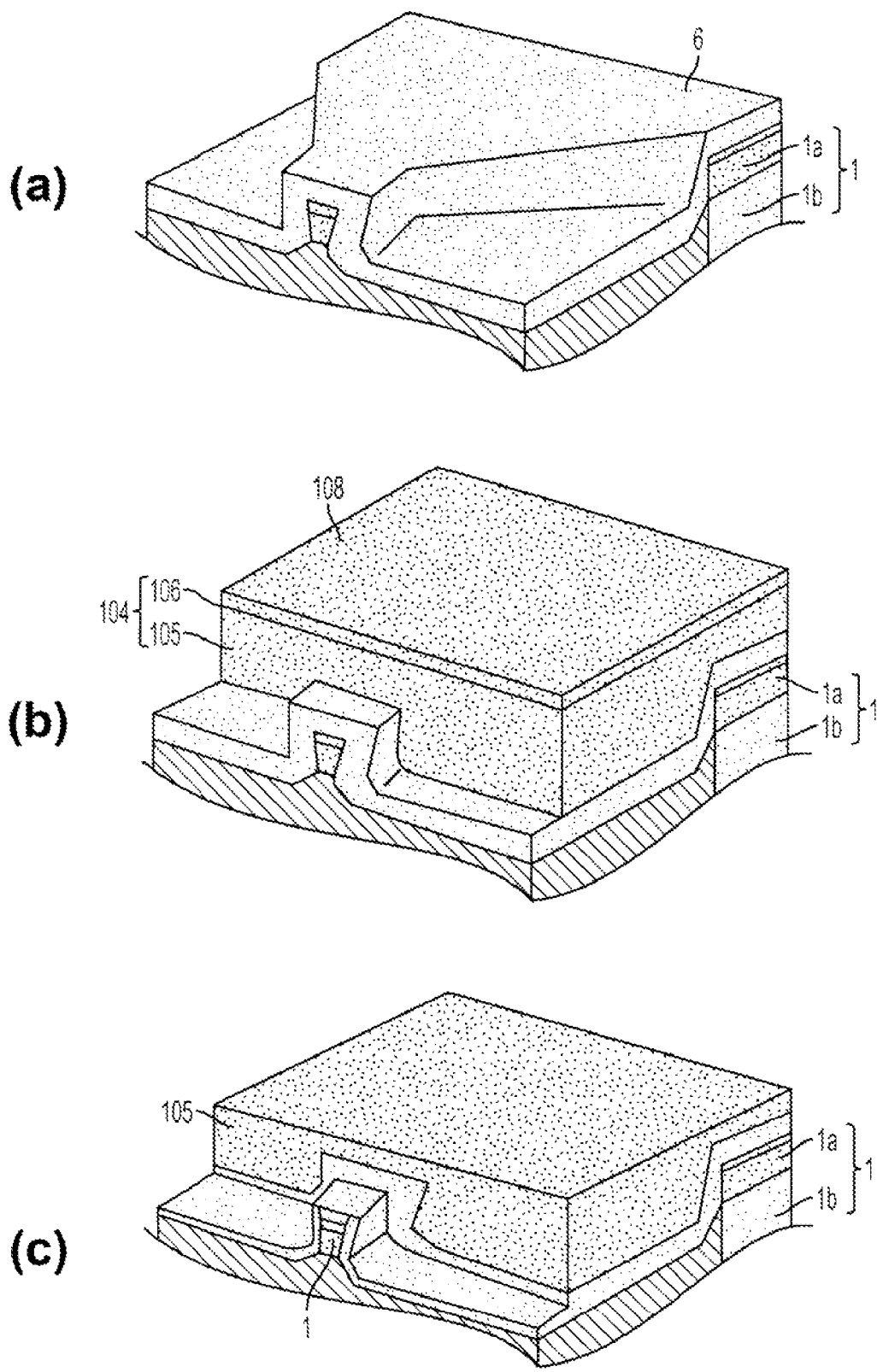
FIG. 11 includes views showing the manufacturing process of the magnetic recording head according to one embodiment.
Figure 12:
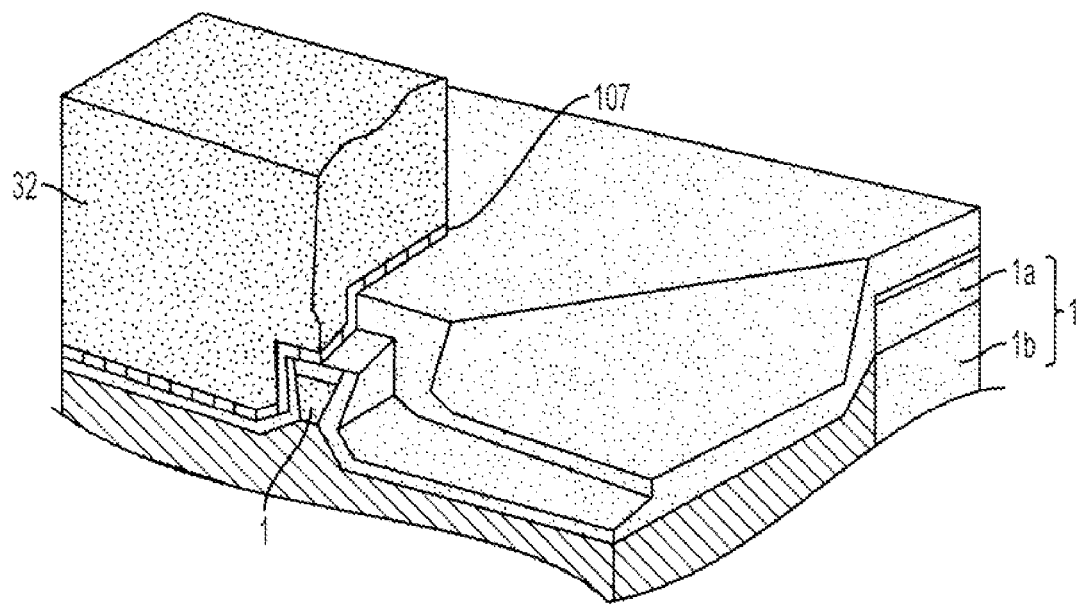
FIG. 12 is a view showing the manufacturing process of the magnetic recording head according to one embodiment.

Next, a manufacturing method of the magnetic recording head of the invention is described. FIGS. 10, 11 and 12 are views of a manufacturing process showing an example of the method of manufacturing the magnetic recording head according to some embodiments. FIG. 10 shows steps in which the yoke portion 1b of the main pole 1 is manufactured, then the yoke portion is flattened by a CMP process, and then the pole tip 1a of the main pole 1 is manufactured. The yoke portion 1b of the main pole 1 is shown in the right of the figure. The air bearing surface is shown in the left of the figure.

As shown in FIG. 10(a), a nonmagnetic cap layer 101 is stacked on a magnetic layer to be the pole tip 1a of the main pole 1, and then heat treatment is performed to stabilize the magnetic layer. For the main pole 1, for example, a single-layer film or a stacked film of a magnetic material having a high saturation magnetic flux density can be used, the material including at least two elements of Co, Ni and Fe. The nonmagnetic cap layer 101 protects a trailing edge of the main pole 1, and for example, a single-layer film or a stacked film of an oxide or a nitride of Al, Si, Ta, Ti and the like, or a single-layer film or a stacked film of nonmagnetic metal such as Cr, NiCr, Rh, Mo, Nb and Au can be used.

Next, as shown in FIG. 10(b), an etching mask layer 100 is formed on a top of the nonmagnetic cap layer 101. The etching mask layer 100 includes an etching layer 102 and a hard layer 103, and a material having high transmittance is preferably used from the limitation of enabling production of an optional pattern by using photolithography. For example, for the etching layer 102, a non-photosensitive resist having a high etching selection ratio to the magnetic layer of the main pole 1 or organic resin such as imide resin is used, and the etching layer has a sufficient thickness to act as a mask material until processing of the magnetic layer of the main pole 1 is finished. For the hard layer 103, for example, a single-layer film or a stacked film having high transmittance of an oxide or a nitride of Al, Si, Ta and Ti is used, and a shape of a photoresist 108 patterned by a photolithography step is transferred to the hard layer 103 by using a method of ion milling, RIE (Reactive Ion Etching), or RIM (Reactive Ion Milling). As a gas for processing, for example, a single gas or a mixed gas of Ar, $CF_4$, $CHF_3$, and $SF_6$ is used. Next, a pattern of the mask is transferred to the etching layer 102 by RIE with the hard layer 103 as a mask. For example, a single gas or a mixed gas of $O_2$, CO, and $CO_2$ is used as a reactive processing gas, thereby an etching selection ratio to the magnetic layer of the main pole 1 is increased. Thus, even if the etching layer 102 is over-etched, and thereby the magnetic layer of the main pole 1 is exposed, the main pole 1 is less affected.

Next, as shown in FIG. 10(c), using the etching mask layer 100, the pole tip 1a portion of the main pole layer 1 is processed by the ion milling method until the air bearing surface has an inverted trapezoidal shape, and the throat height portion of the pole tip 1a is processed to have the writing track width. Then, the etching layer 102 is removed.

FIGS. 11(a) to 11(c) show a manufacturing process of the nonmagnetic layer 6, which magnetically separates the pole tip 1a of the main pole and the shield 32, according to the invention. FIG. 11(a) shows a condition where the nonmagnetic layer 6 is formed over the whole surface in a manner of enclosing the pole tip 1a of the main pole 1 patterned in the previous step. As a method for forming the layer, an apparatus having high covering performance on a sidewall of the pattern is preferably used, including a carousel-type sputter apparatus, an ion beam deposition apparatus, a CVD (Chemical Vapor Deposition) apparatus, or an ALD (Atomic Layer Deposition) apparatus. Thickness of the nonmagnetic layer 6 to be stacked is equal to a gap between a flare side end of the pole tip 1a and the shield 32. In this case, when a gap is small on the trailing side of the pole tip 1a compared with on either side in a track width direction thereof, the gap is adjusted to an optional gap by ion milling at an ion incident angle of 45° to 60°, which corresponds to a milling condition in the case that processing amount is large on a top of a pattern compared with on a side face thereof.

FIG. 11(b) shows a step of forming an etching mask layer 104 for performing processing of the nonmagnetic layer 6 by ion milling. The etching mask layer 104 has the same configuration as the etching mask layer 100 for manufacturing the pole tip 1a of the main pole 1, and since a material and a configuration are the same between the hard layer 103 and a hard layer 106, and between the etching layer 102 and an etching layer 105, detailed description is omitted, and only different steps are described.

In this step, the etching mask layer 104 is formed on a highly-different-level portion of the pole tip 1a. In a photolithography step for performing pattern transfer to the highly-different-level portion, pattern accuracy is reduced due to deformation or displacement of a photoresist or the like. Thus, flattening processing was performed in order to improve accuracy in the photolithography step, in which level difference was absorbed by the etching layer 105 of the etching mask layer 104.

The etching layer 105 was coated over the whole surface of the substrate, then subjected to hardening heat treatment, and then an etch back method was carried out using the RIM method or reactive ion milling, in which a mixed gas of Ar and $O_2$ was used as a reactive gas, and for example, an ion incident angle of 50° to 70° was used, so that a portion having the largest difference in level was processed at an increased processing speed and therefore flattened while etching was performed. As a standard of flatness, the level difference was decreased to at most depth of focus determined by a wavelength and numerical aperture of an aligner used for pattern transfer in the photolithography step. The hard layer 106 and a photoresist 108 were formed by coating on the flattened etching layer 105, so that the etching mask layer 104 was patterned and used.

FIG. 11(c) shows a condition where the nonmagnetic layer 6 is processed by ion milling using the etching mask layer 104, so that a level-difference portion is formed at a boundary between the throat height portion and the flare portion of the pole tip 1a of the main pole 1. Ion milling processing of the nonmagnetic layer 6 was performed while changing ion milling speed to a processed surface by changing an incident angle of the ion milling. First, portions on both sides in the track width direction, which are processed at low processing speed, are processed, for example, using an ion incident angle in a range of 60° to 70°, thereby processing speed is increased in the portions on both sides in the track width direction of the main pole 1 compared within a portion on the trailing side thereof. Next, a nonmagnetic layer 6 on the trailing side of the main pole 1 is preferably processed to be flat, for example, by using an ion incident angle of 45° to 60°, at which re-deposition hardly occurs. The nonmagnetic layer 6 on the trailing side of the main pole 1 is processed to be flat, so that an interval between the shield layer 32 formed via the nonmagnetic layer 6 and a trailing edge of the main pole 1 is made uniform, which may reduce curvature at a bit side of a writing field of the main pole 1. After processing, the etching layer 105 is removed.

FIG. 12 shows a perspective, schematic view of the shield 32 formed via the nonmagnetic layer according to one embodiment. Since the shield 32 is formed and patterned by an electroplating method, an electrode layer 107 is formed over the whole top of the nonmagnetic layer 6. As the electrode layer, for example, a single-layer film or a stacked film of a magnetic material including at least two elements of Co, Ni and Fe can be used. A pattern of the shield 32 is formed on the electrode layer 107 by photolithography using a resist. After the shield 32 is plated, the resist is removed, and then the electrode layer 107 is removed by etching using ion milling.

The shield 32 has two kinds of height in the element height direction from the air bearing surface due to the level-difference of the nonmagnetic layer 6. A shield near the main pole 1, which has a height from the air bearing surface to the level difference, prevents write blurring of the main pole 1 so as to define writing width on either side in the track width direction, and acts as a shielding section for improving a writing field gradient on the trailing side. A shield, which has a height from the air bearing surface to a flare side end, has a saturation prevention function of flowing a magnetic flux to prevent a phenomenon that the shield is saturated by a magnetic flux absorbed by the shielding section, leading to magnetic flux leakage. In addition, since a gap between the main pole 1 and the relevant shield 32 is widened by the nonmagnetic layer 6, a magnetic flux from the main pole 1, which is absorbed by the shield 32 and thus lost, is reduced, leading to improvement in writing field strength of the main pole 1. Moreover, even if the shield varies in the element height direction during a manufacturing process of the shield 32, since the shielding section is defined by the level difference of the nonmagnetic layer 6, a stable magnetic field gradient can be kept.

Other examples of the manufacturing method of the magnetic recording head of the invention are described. Here, only steps different from the steps shown in FIGS. 10 to 12 are described. Manufacturing methods of the magnetic recording heads in the example shown in FIG. 9 are described.

In the structure shown in FIG. 9(a), thickness of the nonmagnetic layer 6 is different in two stages. A first thickness exists along the throat height from the air bearing surface. Since a second thickness is changed on a flare side, while volume of the shield 32, which is formed in accordance with a surface shape of the nonmagnetic layer 6, is stepwise increased, a magnetic flux in the shielding section is flowed. Even if the first processed level-difference is provided more adjacently to the air bearing surface, so that the shield of the shielding section is formed low in the element height direction, saturation of the shield can be prevented.

The magnetic recording head is manufactured by repeating the steps shown in FIG. 11 two times. In formation of the second processed level-difference on the flare side, the nonmagnetic layer 6 is processed by ion milling using an etching mask layer 104, and then the etching mask layer 104 is removed. Then, an etching mask layer 104 is formed on the throat height of the main pole 1 to process the nonmagnetic layer 6.

In formation of the structure shown in FIG. 9(b), thickness of the nonmagnetic layer 6 is changed in a taper manner such that an interval between the main pole 1 and the shield 32 has a portion being expanded in the element height direction from the air bearing surface, so that while shield volume is increased, local magnetic field saturation of the shielding section is prevented.

In manufacturing of the magnetic recording head, the nonmagnetic layer 6 is processed according to the steps shown in FIG. 11 to form a level-difference, then the etching mask layer 104 is removed. In a condition that the nonmagnetic layer 6 is wholly exposed, the nonmagnetic layer is subjected to rotation processing using ion milling, for example, at an incident angle in a range of about 50° to about 70°, thereby an edge portion of the processed level-difference portion is locally processed at high speed, and consequently the level-difference portion is formed in a taper shape. At that time, since a nonmagnetic layer on the trailing side of the main pole 1 is also processed, cutting allowance may be left.

Figure 13:
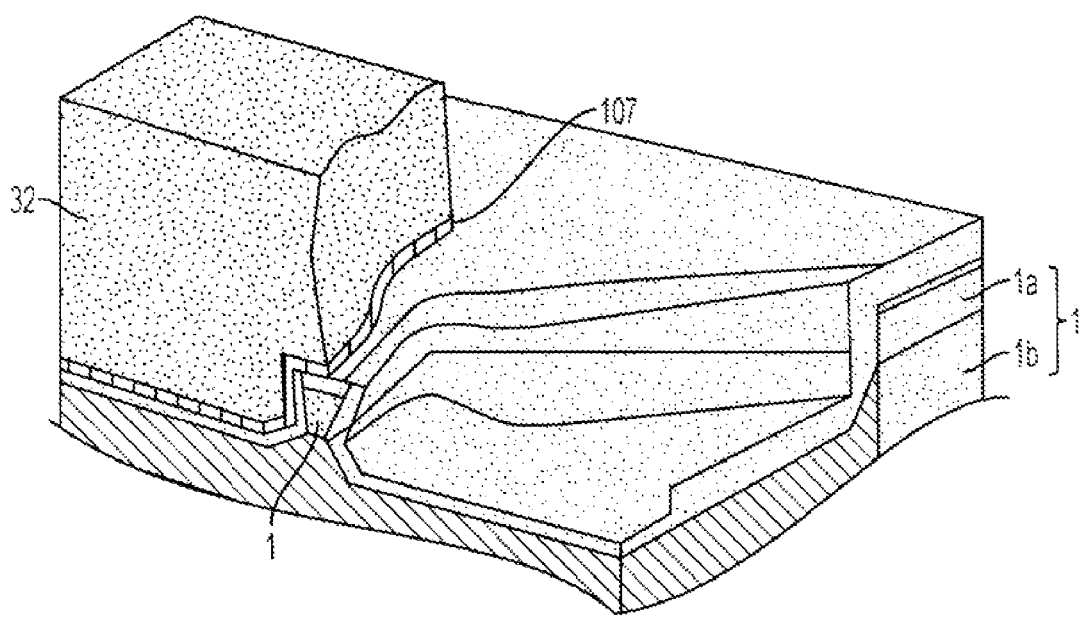
FIG. 13 is a view showing another example of the magnetic recording head according to one embodiment.

Furthermore, FIG. 13 shows an example where edge portions of the level-difference portion of the nonmagnetic layer 6 are rounded and tapered during the manufacturing process of the head. An edge is formed even in the shield 32 formed via the nonmagnetic layer 6 due to the edge of the level-difference portion formed in the nonmagnetic layer 6. Concentration of magnetic fluxes occurs at the edge of the shield 32, which induces magnetic flux leakage due to local shield saturation, so that information written into the recording medium 11 is concernedly erased. Thus, the edge portions of the nonmagnetic layer 6 are rounded and tapered, thereby such a rounded and tapered shape is transferred to the shield 32, so that magnetic fluxes are dispersed from the edge portions in the shield 32, and consequently local saturation of the shield is preferably prevented.

The following list is a description of the reference numerals and signs, and is provided for quick reference to the references consistent throughout the various figures included herein:

1: main pole
    1a: pole tip
    1b: main-pole yoke section
    2: thin film conductor coil
    3: auxiliary pole
    4: reproducing element
    8: lower shield
    9: upper shield
    11: magnetic disk
    12: suspension arm 13: magnetic head slider
15: rotary actuator
17: pillar
19: magnetic recording layer
20: under layer
24: reproducing head
25: recording head
32: shield
100: etching mask layer
101: nonmagnetic cap layer
102: etching layer
103: hard layer
104: etching mask layer
105: etching layer
106: hard layer
107: electrode layer
108: photoresist It should be noted that methodology presented herein for at least some of the various embodiments may be implemented, in whole or in part, in computer hardware, software, by hand, using specialty equipment, etc. and combinations thereof.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic recording head, comprising:
a main pole having a throat height portion and a flare portion that is connected to the throat height portion, the main pole gradually being expanded in width to an upper part thereof in an element height direction;
a sub pole;
magnetic shields disposed via a nonmagnetic layer on a trailing side of the main pole and on both sides thereof in a track width direction of the main pole; and
a coil for generating a recording magnetic field from the main pole,
wherein the nonmagnetic layer has a portion of which the thickness is increased stepwise or increased in a tapered manner in an upper part in the element height direction with respect to an air bearing surface side facing a recording medium, and
wherein each portion of the magnetic shields adjacent to the main pole has a shape corresponding to a surface shape of the nonmagnetic layer.

2. The magnetic recording head according to claim 1:
wherein the nonmagnetic layer is formed along the throat height portion and the flare portion, and
wherein a thickness of the nonmagnetic layer is different between the throat height portion and the flare portion.

3. The magnetic recording head according to claim 1, wherein a thickness change point of the nonmagnetic layer is provided in the throat height portion.

4. The magnetic recording head according to claim 1, wherein the nonmagnetic layer is changed in thickness in two stages on a trailing side of the throat height portion.

5. The magnetic recording head according to claim 1, wherein the nonmagnetic layer has a region in which thickness is gradually increased in the element height direction on a trailing side of the throat height portion.

6. A method of manufacturing a magnetic recording head, the method comprising:
processing a magnetic film formed on a substrate to form a pole tip of a main pole, the pole tip having a throat height portion and a flare portion;
forming a nonmagnetic layer, including enclosing the pole tip;
forming an etching layer on the nonmagnetic layer;
flattening the etching layer;
forming a hard layer on the flattened etching layer, the hard layer including an oxide film, a nitride film, or a metal film having a large processing selection ratio to the etching layer;
removing a region in the hard layer, the region corresponding to an air bearing surface side with respect to a straight line crossing the throat height portion of the pole tip at a predetermined position;
etching the etching layer with the hard layer as a mask;
processing the nonmagnetic layer by ion milling using the hard layer and the etching layer as a mask so that a level difference is formed in the nonmagnetic layer covering the throat height portion of the pole tip of the main pole; and
forming a magnetic layer as a shield after removing the etching layer.

7. The method of manufacturing a magnetic recording head according to claim 6:
wherein the etching layer is an organic resin layer; and
wherein the flattening is performed using reactive ion milling until the level difference is decreased to at most a depth of focus of an aligner used in the photolithography.

8. A magnetic recording device, comprising:
a magnetic recording medium;
a motor that drives the magnetic recording medium;
a magnetic head mounted with a recording head; and
a head drive section that drives the magnetic head onto a desired track position of the magnetic recording medium,
wherein the recording head includes a main pole having:
a throat height portion;
a flare portion that is connected to the throat height portion;
a sub pole;
magnetic shields disposed via a nonmagnetic layer on a trailing side of the main pole and on both sides thereof in a track width direction of the main pole; and
a coil for generating a recording magnetic field from the main pole,
wherein the flare portion is gradually expanded in width to an upper part thereof in an element height direction,
wherein the nonmagnetic layer has a portion of which the thickness is increased stepwise or increased in a tapered manner in an upper part in the element height direction with respect to an air bearing surface side facing a recording medium, and
wherein each portion of the magnetic shields adjacent to the main pole has a shape corresponding to a surface shape of the nonmagnetic layer.

9. The magnetic recording head according to claim 8:
wherein the nonmagnetic layer is formed along the throat height portion and the flare portion, and
wherein a thickness of the nonmagnetic layer is different between the throat height portion and the flare portion.

10. The magnetic recording head according to claim 8, wherein a thickness change point of the nonmagnetic layer is provided in the throat height portion.

11. The magnetic recording head according to claim 8, wherein the nonmagnetic layer is changed in thickness in two stages on a trailing side of the throat height portion.

12. The magnetic recording head according to claim 8, wherein the nonmagnetic layer has a region in which thickness is gradually increased in the element height direction on a trailing side of the throat height portion.

* * * * *

UNITED STATES PATENT AND TRADEMARK OFFICE
CERTIFICATE OF CORRECTION

| | | |
|---|---|---|
| PATENT NO. | : 8,351,153 B2 | Page 1 of 1 |
| APPLICATION NO. | : 12/559349 | |
| DATED | : January 8, 2013 | |
| INVENTOR(S) | : Nunokawa et al. | |

It is certified that error appears in the above-identified patent and that said Letters Patent is hereby corrected as shown below:

In the specification:

col. 6, line 65 replace "soil" with --soft--.

Signed and Sealed this
Fourteenth Day of May, 2013

Teresa Stanek Rea
*Acting Director of the United States Patent and Trademark Office*